June 2, 1953 — A. LEMIEUX — 2,640,696
DUMBBELL WITH ADJUSTABLE WEIGHTS
Filed March 26, 1952
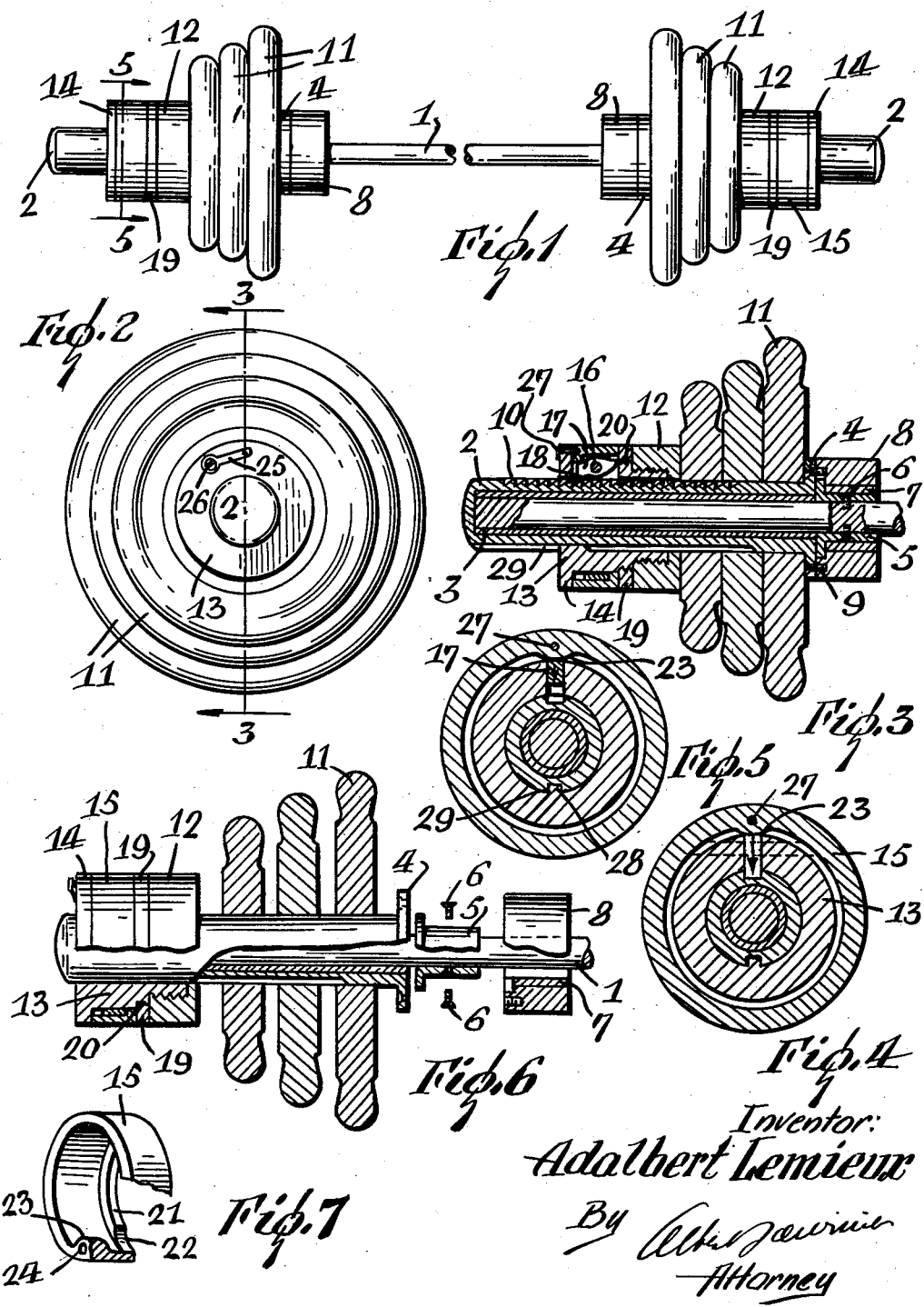
Inventor:
Adalbert Lemieux Patented June 2, 1953

2,640,696

UNITED STATES PATENT OFFICE 2,640,696

DUMBBELL WITH ADJUSTABLE WEIGHTS

Adalbert Lemieux, Vancouver, British Columbia, Canada

Application March 26, 1952, Serial No. 278,680

6 Claims. (Cl. 272—84)

The present invention pertains to a novel exercising apparatus in the nature of a dumbbell or gymnasium bar.

The principal object of the invention is to provide a device of this character having adjustable weights on the ends with releasable means for clamping the weights tightly together. This means is in the form of an assembly which slides on the bar into engagement with the outermost weight and is normally held against sliding in the opposite direction. However, the locking mechanism is easily releasable, so that the assembly may be withdrawn for adjusting the weights.

In the accomplishment of this object, the aforementioned assembly includes a nut slidable on the bar into contact with the outermost weight and receiving a hollow screw which also slides on the bar. The screw carries a pivoted pawl engageable selectively with rack teeth formed on the bar. The screw is surrounded by a rotatable collar which covers the pawl and has a boss that holds the pawl in engagement with the rack teeth.

The screw also carries a pin that enters the boss and holds the collar against relative rotation, so that the pawl remains locked in the teeth. To release the pawl, the pin is first withdrawn and the collar rotated to take the pressure off the working end of the pawl. The free end of the pawl is normally held in a cam notch formed in a flange of the collar. Thus, as the collar is turned, the free end of the pawl is engaged by a cam surface that lifts the working end away from the teeth.

The invention is fully disclosed by way of example in the following description and in the accompanying drawings in which:

Figure 1 is a side elevation of the device;

Figure 2 is an end view;

Figure 3 is a section on the line 3—3 of Figure 2;

Figure 4 is a cross section;

Figure 5 is a similar section on the line 5—5 of Figure 1;

Figure 6 is a detail longitudinal section, partly in elevation; and

Figure 7 is a detail perspective view.

Reference to these views will now be made by use of like characters which are employed to designate corresponding parts throughout.

The device includes a straight bar 1 of uniform cross sectional shape and fitted at each end with a tubular cap 2 over a bronze bushing 3. Inasmuch as the assembly is the same at each end, only one assembly will be described.

The inner end of each cap 2 is flanged at 4, and adjacent thereto is a flanged bushing 5 fastened to the bar 1 by screws 6. The bushing is surrounded by a liner 7 and then by a collar 8 fastened to the flange by screws 9.

Each cap 2 is formed with a longitudinal series of rack teeth 10 for a purpose that will presently be described. A desired number of weight disks 11 are slipped over the cap and against the flange 4 which is held onto reinforced bar by the assembly 5—9. An oversized nut 12 is slid over the cap 2 and against the outermost disk 11. The purpose of the nut is to clamp the disks togeteher, and this is accomplished by the means that will now be described.

A hollow screw 13 with a flanged head 14 is adapted to be screwed into the nut 12 but is preassembled with other parts before this is done. Beneath the flange 14 is a rotary collar 15. In the screw 13 is a cross pin 16 pivotally supporting a pawl 17, one end 18 of which is adapted to engage the teeth 10. A ring 19 screws on a larger thread 20 of the screw 13 to retain the collar 15.

The inner end of the collar 15 has an inward flange 21 formed with a cam notch 22 adapted to receive the free end of the pawl 17 as will presently be described. Opposite the notch 22, the collar 15 has an inward boss 23 with a longitudinal hole 24. A flat spring 25 is attached to the top of the head 14 at one end by a screw 26, and the remaining end carries a pin 27 adapted to enter the hole 24, to lock the collar against rotation. The screw 13 has a key 28 received in a longitudinal slot 29 in the cap 2, whereby the screw and nut are prevented from turning after the assembly has been made.

It will be noted that in the locking position, the boss 23 holds the pawl 17 in engagement with the teeth 10, the pawl being carried by the screw 13. The slope of the teeth 10 is such that the pawl may slide with the assembly toward the weights 11 but not in the opposite direction. When it is desired to release the pawl for adjusting the weights, the free end of the spring 25 is lifted by the finger to release the pin 27 from the boss 23. The collar 15 is then turned so that the boss 23 moves away from the pawl and the flange 21 cams over the free end of the pawl to lift its working end 18 out of the notches. The assembly 12—27 can now be withdrawn from the cap 2 to permit adjustment of the weights, after which this assembly is restored to the position shown in Figure 3.

Although a specific embodiment of the inven-

What I claim is:

1. Exercising apparatus comprising an elongated bar having a series of rack teeth at one end, weights removably mounted on said end, an assembly on said end and bearing against the outermost weight, a pawl carried by said assembly and engageable with said teeth, a collar rotatably surrounding said pawl and having a boss holding said pawl in engagement with said teeth, and releasable means for locking said collar to said assembly.

2. Exercising apparatus comprising an elongated bar having a series of rack teeth at one end, weights removably mounted on said end, an assembly on said end and bearing against the outermost weight, a pawl carried by said assembly and engageable with said teeth, a collar rotatably surrounding said pawl and having a boss holding said pawl in engagement with said teeth, and releasable means for locking said collar to said assembly, said collar having a flange with a cam notch receiving the free end of said pawl, whereby said pawl is lifted from said teeth on releasing said means and turning said collar.

3. Exercising apparatus comprising an elongated bar having a series of rack teeth at one end, weights removably mounted on said end, an assembly on said end and bearing against the outermost weight, a pawl carried by said assembly and engageable with said teeth, a collar rotatably surrounding said pawl and having a boss holding said pawl in engagement with said teeth, a flat spring having one end fastened to the head of said assembly, and a pin on the other end of said spring and receivable in said boss.

4. Exercising apparatus comprising an elongated bar having a series of rack teeth at one end, weights removably mounted on said end, an assembly on said end and bearing against the outermost weight, a pawl carried by said assembly and engageable with said teeth, a collar rotatably surrounding said pawl and having a boss holding said pawl in engagement with said teeth, a flat spring having one end fastened to the head of said assembly, and a pin on the other end of said spring and receivable in said boss, said collar having a flange with a cam notch receiving the free end of said pawl, whereby said pawl is lifted from said teeth on releasing said pin and turning said collar.

5. Exercising apparatus comprising an elongated bar having a series of rack teeth at one end, weights removably mounted on said end, a nut on said end and bearing against the outermost weight, a hollow screw in said nut, a pawl carried by said screw and engageable with said teeth, a collar rotatably surrounding said pawl and having a boss holding said pawl in engagement with said teeth, and releasable means for locking said collar to said screw.

6. Exercising apparatus comprising an elongated bar having a series of rack teeth at one end, weights removably mounted on said end, a nut on said end and bearing against the outermost weight, a hollow screw in said nut, a pawl carried by said screw and engageable with said teeth, a collar rotatably surrounding said pawl and having a boss holding said pawl in engagement with said teeth, and releasable means for locking said collar to said screw, said collar having a flange with a cam notch receiving the free end of said pawl, whereby said pawl is lifted from said teeth on releasing said means and turning said collar.

ADALBERT LEMIEUX.

References Cited in the file of this patent

UNITED STATES PATENTS

| Number | Name | Date |
|---|---|---|
| 1,991,520 | Postl | Feb. 19, 1935 |
| 2,209,465 | Matysek | July 30, 1940 |
| 2,244,351 | Venables | June 3, 1941 |
| 2,263,135 | Johnson | Nov. 18, 1941 |
| 2,470,815 | Harvey | May 24, 1949 |